United States Patent
Chen et al.

(10) Patent No.: US 7,680,087 B2
(45) Date of Patent: Mar. 16, 2010

(54) WIRELESS STATE MACHINE AND MULTIPLEXING METHOD FOR CONCURRENT AD-HOC AND INFRASTRUCTURE MODE SERVICE IN WIRELESS NETWORKING

(75) Inventors: Paul Chen, Huntington Beach, CA (US); Richard Alexander Wilson, Jr., Fallbrook, CA (US)

(73) Assignee: Canon U.S.A., Inc., Lake Success, NY (US)

(*) Notice: Subject to any disclaimer, the term of this patent is extended or adjusted under 35 U.S.C. 154(b) by 1589 days.

(21) Appl. No.: 10/935,922

(22) Filed: Sep. 8, 2004

(65) Prior Publication Data
US 2006/0050729 A1   Mar. 9, 2006

(51) Int. Cl.
*H04W 4/18* (2009.01)
(52) U.S. Cl. ............... 370/338; 370/352; 370/450; 370/461; 380/258; 380/28; 455/454; 455/561; 607/9; 701/200; 709/220; 713/160
(58) Field of Classification Search .......... 370/352, 370/338, 450, 461; 380/28, 258; 455/454, 455/561; 607/9; 701/200; 709/220; 713/160
See application file for complete search history.

(56) References Cited

U.S. PATENT DOCUMENTS

| | | | | |
|---|---|---|---|---|
| 5,702,425 A * | 12/1997 | Wickham | ................... | 607/9 |
| 6,665,269 B1 | 12/2003 | Schmitz | | |
| 6,665,311 B2 | 12/2003 | Kondylis et al. | | |
| 6,925,378 B2 * | 8/2005 | Tzamaloukas | .............. | 701/200 |
| 6,978,023 B2 * | 12/2005 | Dacosta | ................... | 380/258 |
| 7,103,314 B2 * | 9/2006 | Li | .............................. | 455/41.2 |
| 7,221,667 B2 * | 5/2007 | Hori et al. | ................... | 370/338 |
| 7,233,603 B2 * | 6/2007 | Lee | ........................... | 370/445 |
| 7,274,911 B2 * | 9/2007 | Li | .............................. | 455/41.2 |
| 7,522,551 B2 * | 4/2009 | Giaimo et al. | .............. | 370/328 |
| 2002/0176366 A1 | 11/2002 | Ayyagari et al. | | |
| 2003/0053437 A1 | 3/2003 | Bahl et al. | | |
| 2003/0054818 A1 | 3/2003 | Bahl et al. | | |
| 2003/0063589 A1 | 4/2003 | Haines | | |
| 2003/0080992 A1 | 5/2003 | Haines | | |
| 2003/0081561 A1 * | 5/2003 | Hsiao | ......................... | 370/310 |
| 2003/0142652 A1 * | 7/2003 | Ting et al. | .................... | 370/338 |
| 2003/0229816 A1 * | 12/2003 | Meynard | .................... | 713/600 |
| 2004/0004973 A1 * | 1/2004 | Lee | ........................... | 370/445 |
| 2004/0063458 A1 * | 4/2004 | Hori et al. | ................ | 455/554.2 |
| 2004/0103278 A1 * | 5/2004 | Abhishek et al. | ........... | 713/160 |
| 2004/0127240 A1 * | 7/2004 | Li | .............................. | 455/500 |
| 2004/0156351 A1 * | 8/2004 | Kim | .......................... | 370/349 |
| 2004/0163000 A1 * | 8/2004 | Kuhlmann et al. | .......... | 713/300 |

(Continued)

*Primary Examiner*—Gerald Gauthier

(57) ABSTRACT

The present invention relates to a state machine which has a dual process which receives and concurrently processes ad-hoc and infrastructure processes. The dual process state concurrently executes both processes by either over-clocking a media access control core, or by routing the processes to multiple media access control cores for processing. The state machine contains an ad-hoc process state which accepts either an ad-hoc or an infrastructure signal, and either processes the signal if the received signal is an ad-hoc signal, or transfers control to an infrastructure process state for processing if the received signal is an infrastructure signal. The state machine also contains an infrastructure process state which accepts either an ad-hoc or an infrastructure signal, and either processes the signal if the received signal is an infrastructure signal, or transfers control to an ad-hoc process state for processing if the received signal is an ad-hoc signal.

37 Claims, 11 Drawing Sheets

U.S. PATENT DOCUMENTS

| | | | |
|---|---|---|---|
| 2004/0214539 A1* | 10/2004 | Rajamani et al. | 455/161.1 |
| 2004/0264425 A1* | 12/2004 | Nishikawa | 370/338 |
| 2005/0048961 A1* | 3/2005 | Ribaudo et al. | 455/419 |
| 2005/0063348 A1* | 3/2005 | Donovan | 370/338 |
| 2005/0122940 A1* | 6/2005 | Nian | 370/338 |
| 2005/0147071 A1* | 7/2005 | Karaoguz et al. | 370/338 |
| 2005/0165916 A1* | 7/2005 | Cromer et al. | 709/220 |
| 2005/0215266 A1* | 9/2005 | Tsien et al. | 455/454 |
| 2005/0216726 A1* | 9/2005 | Dellmo et al. | 713/151 |
| 2005/0256937 A1* | 11/2005 | Lewis | 709/217 |
| 2006/0135209 A1* | 6/2006 | Nakakita et al. | 455/561 |
| 2006/0153133 A1* | 7/2006 | Zhong | 370/331 |
| 2007/0055870 A1* | 3/2007 | Bruti et al. | 713/168 |
| 2008/0025501 A1* | 1/2008 | Sato et al. | 380/28 |
| 2008/0133716 A1* | 6/2008 | Rao et al. | 709/220 |
| 2008/0305738 A1* | 12/2008 | Khedouri et al. | 455/3.06 |
| 2009/0161643 A1* | 6/2009 | Ihori et al. | 370/338 |

* cited by examiner

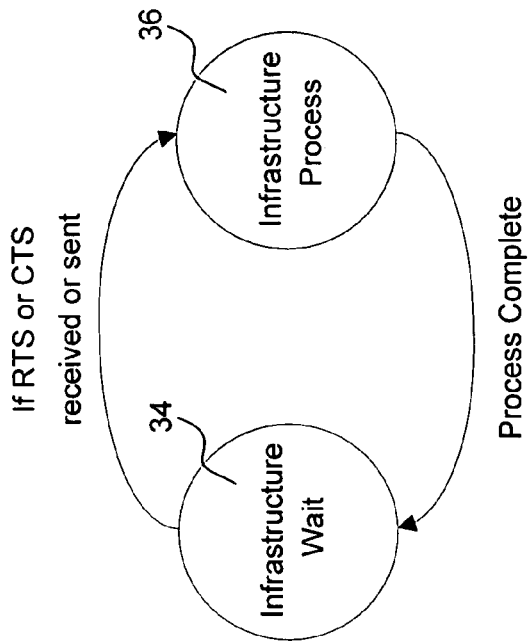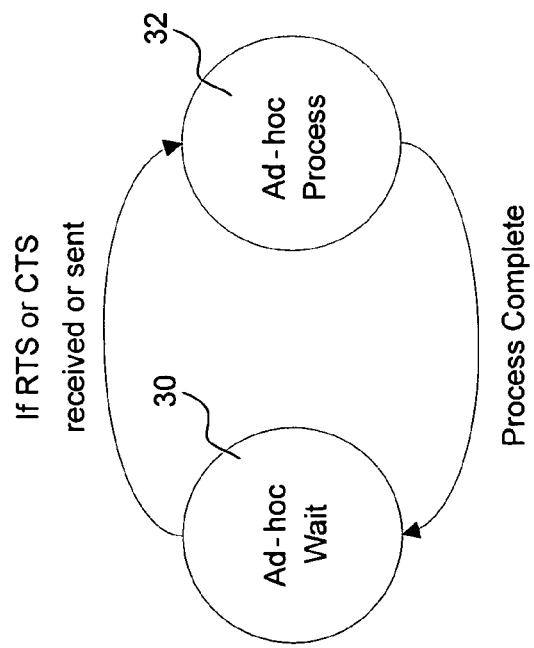
Figure 2 Prior Art

Assigned Dual MAC

| MAC Primary Core 50a | AHW | AHW | AHW | AHP | AHP | AHW | AHW | AHP | AHP | AHP | AHP | AHW |
|---|---|---|---|---|---|---|---|---|---|---|---|---|
| MAC Secondary Core 50b | IFW | IFW | IFW | IFP | IFP | IFW | IFW | IFP | IFP | IFP | IFW | IFW |

FIFO Dual MAC

| MAC Primary Core 50a | AHW | IFW | AHW | AHP | AHP | AHW | IFW | IFP | IFP | IFP | IFP | IFW |
|---|---|---|---|---|---|---|---|---|---|---|---|---|
| MAC Secondary Core 50b | Off | Off | Off | IFP | IFW | Off | Off | AHP | AHP | AHW | AHW | Off |

Legend

AHW = Ad-hoc Wait
AHP = Ad-hoc Process
IFW = Infrastructure Wait
IFP = Infrastructure Process

Figure 7

WIRELESS STATE MACHINE AND MULTIPLEXING METHOD FOR CONCURRENT AD-HOC AND INFRASTRUCTURE MODE SERVICE IN WIRELESS NETWORKING

BACKGROUND OF THE INVENTION

1. Field of the Invention

The present invention relates to a state machine for switching between ad-hoc and infrastructure modes to allow concurrent, multiplexed, service of both wireless networking modes.

2. Description of the Related Art

Wireless networking technology has quickly become a widespread method for maintaining network connectivity in both the office and the home. The convenience of being able to maintain connectivity to the network while moving around the office has been the driving force of wireless networking adoption. The first phase of wireless technology adoption was targeted at products that were expected to have connectivity and/or synchronizing capabilities to the network. Personal computers (PCs), laptops, and handheld organizers (i.e., PDAs) are examples of early wireless adoption. However, with competition and proliferation, the cost of wireless technology has dropped tremendously. Now, it is economically feasible to add wireless network capabilities to products that previously have not had such capabilities.

Wireless networking technology uses radio or microwaves to communicate between multiple computers or peripherals connected to the network, whereas wired networks use copper or fiber optic wires. Using wireless technology, a user can transfer files, share an already existing Internet connection, or remotely control or configure another computer or peripheral in the same network without the need for physical wires. Not having to wire an office or a home is an advantage of wireless networking. Another advantage is giving users the ability to use their computers and PDA's while being able to move around a home, office, or public hot spot without having to be plugged into a network. These wireless network devices communicate with the each other via wireless network cards or access points.

FIG. 1 illustrates the basic architecture of a wireless network card containing diversity switch antennae. The three layers of the wireless network card are the physical layer 2, the physical to data link layer 4, and the remaining layers 6. Physical layer 2 has antennae 8, diversity switch 10, band pass filter 12, transmit/receive (T/R) switch 14, power amp 16, RF/IF transceiver 22, loop filter 18, and voltage control oscillator (VCO) 20. Antennae 8 receive and send radio signals. The diversity switch 10 switches between the antennae based on signal strength or based on which antenna was used last for transmission or reception of a radio signal. Band pass filter 12 processes the received signals from antennae 8. T/R switch 14 switches between transmitting and receiving signals. The radio signals are then further processed by power amp 16, RF/IF transceiver 22, loop filter 18, and VCO 20. Physical to data link layer 4 contains baseband processor 24 and media access control (MAC) core 26a. Remaining layers 6 contain host 28.

Using this architecture, wireless network cards currently operate in two modes. The first mode is peer-to-peer or Ad-hoc mode, which allows peer-to-peer networking. In ad-hoc mode, multiple computers or peripherals can network without the need for network credentials, an access point, or other similar wireless networking equipment. FIG. 2 illustrates the state machine for ad-hoc mode. The state machine contains ad-hoc wait state 30 which waits to receive request-to-send (RTS) signals or send clear-to-send (CTS) signals. If an ad-hoc RTS or CTS signal is received or sent, ad-hoc wait state 30 transitions to ad-hoc process state 32, where the ad-hoc process is executed. After the ad-hoc process is executed, ad-hoc process 32 transitions back to ad-hoc wait state 30.

The second mode is LAN or Infrastructure mode. This mode gives a network administrator more control over the wireless network by allowing the wireless channel to be locked down and secure. Infrastructure mode typically requires the user to specify user credentials in order to use the wireless network. FIG. 2 illustrates the state machine for infrastructure mode. The state machine contains infrastructure wait state 34 which waits to receive or send infrastructure RTS or CTS signals. If an infrastructure RTS or CTS signal is received or sent, infrastructure wait state 34 transitions to infrastructure process state 36, where the infrastructure process is executed. After the infrastructure process is executed, infrastructure process 36 transitions back to infrastructure wait state 34.

Both wireless networking modes are viable and useful. However, there are scenarios where having both modes available provides a convenient method for using wireless networking resources. For example, a user can be an unsecured ad-hoc user of a network system while at the same time, the system may require intranet infrastructure to operate the system.

A scenario where both modes of wireless networking may be needed is networked computer projectors. For example, having ad-hoc mode available would allow peer-to-peer networking, which is convenient when a visitor to a company needs to use a projector connected to the company's internal network. The visitor, who has no network credentials, can send presentations to the projector as long has he has his PC wireless card in ad-hoc mode. At the same time, infrastructure mode would allow employees of the company to operate and manage the projector as a networked resource.

Another scenario where dual mode wireless technology may be utilized is in wireless networked printing. For example, in a company, a visitor may need to print documents to a wireless printer. The ideal method of printing would be ad-hoc mode, since it would allow the user to easily send a print job to a printer without network credentials. In the same scenario, infrastructure mode would allow employees of the company, such as a network administrator to securely configure and update the printer as a networked resource.

Yet another scenario where both wireless networking modes are needed is a wireless Internet café. Currently, intranet tracking by the café owner is done using wired methods, while wireless access is offered to the public via ad-hoc mode. Thus, in this setup, existing wireless Internet café's are not completely wireless. The wired side of the network connects to a full service, fixed location PC.

In a 100% wireless Internet café, customer access to the Internet should be via ad-hoc mode for the purposes of allowing easy access to the networking resources. However, the café owner needs to monitor network traffic for charging purposes. Because of security reasons, these activities should be via infrastructure mode. This would enable the café owner to securely track wireless networks from a central wireless computer within the wireless infrastructure.

Currently, most manufacturers of networking products requiring two physical network links will include the capability for either two wired connections or one wired connection and one wireless connection. It may be possible that two wireless connections are supported. In the case of having two wireless connections, one connection would be configured for infrastructure mode and the other for ad-hoc mode.

Some manufacturers have provided two PCMCIA slots for two wireless network cards, with one card operating in ad-hoc mode and the other operating in infrastructure mode. However, as discussed in U.S. Pat. No. 6,665,269, interference and crosstalk from two wireless network cards which are in close proximity from each other present a problem. Since both wireless cards are transmitting at full duplex to the same frequency band, an increase in signal-to-noise ratio results. This is due to the fact that because there are two wireless network cards transmitting at the same time, the physical layer components of each card are essentially noise interferences to the other card. The close physical proximity of the cards' antennae result in the transmissions of the cards colliding with one another. In addition to this, the receiving channels of cards may conflict with each other.

Current wireless cards and antennae were designed to deal with multi-path interference, hence the work to develop the diversity switch antenna model. In this model, when the radio is in receive mode, it will constantly switch between antennae to listen for a valid radio packet. After hearing the beginning sync of a valid packet, the radio will evaluate the sync signal of the packet on that particular antenna, and then switch to and evaluate the other antenna. After evaluating both antennae, the radio will select the best antenna to receive the remaining portion of the packet. While transmitting a packet, the radio will reuse the same antenna that received the packet. If there is a packet failure, the radio will switch to the other antenna.

However, placing two diversity switch antennae within close proximity to each other causes over-correction and unusual interference. In addition, the problem of having two reception antennae is a classic dipole reflection electromagnetic problem. Using two wireless network cards near each other would see noise and interference at each stage of processing, from the antennae to the MAC layer.

To overcome the previously stated problem, it would be preferable to provide concurrent service between the two wireless networking modes using a single, modified, wireless network card. It would be preferable to use a state machine to switch between the two wireless networking modes. It would also be preferable to have a dual MAC core in the single wireless card that can concurrently support both wireless networking modes.

BRIEF SUMMARY OF THE INVENTION

The present invention addresses the foregoing problems by providing a state machine which has an ad-hoc wait state and an infrastructure wait state. Each wait state waits for their respective RTS or CTS signals to be received or sent. If the RTS or CTS signals are received or sent within a predetermined timeout, the wait state will transition to the processing state which executes the process.

If both types of RTS or CTS signals are received or sent within a short time period from each other, or if, for example, an ad-hoc RTS is received or a CTS sent while the MAC core is executing an infrastructure process, the state machine will transition to the dual process state, which concurrently executes both types of processes.

The dual process state may be achieved by having a radio control port that can detect and handle both types of wireless signals and a dual MAC core that concurrently executes both types of wireless processes. In one embodiment of the dual MAC core, one MAC core may be assigned to execute ad-hoc processes while the other may be assigned to execute infrastructure processes. In another embodiment of the dual MAC core, the primary MAC core may be assigned to execute an ad-hoc or an infrastructure process, whichever process arrives first, while the secondary MAC core may be assigned to process the other type of process. In another embodiment of the dual MAC core, the MAC core runs at a normal clocked rate while executing either an ad-hoc or an infrastructure process. If, for example, the MAC core is currently executing an ad-hoc process and then receives an infrastructure process, the MAC core will concurrently execute both processes at an over-clocked rate, to compensate for the increased load of processes. In yet another embodiment of the dual MAC core, all the embodiments previously stated may be executed using a MAC core implemented in a software program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 illustrates the state diagram of ad-hoc and infrastructure wireless networking modes (prior art.)

FIG. 7 illustrates a simplified timing diagram of the assigned dual MAC and the FIFO dual MAC.

DETAILED DESCRIPTION OF THE INVENTION

State Machine

Figure 3:
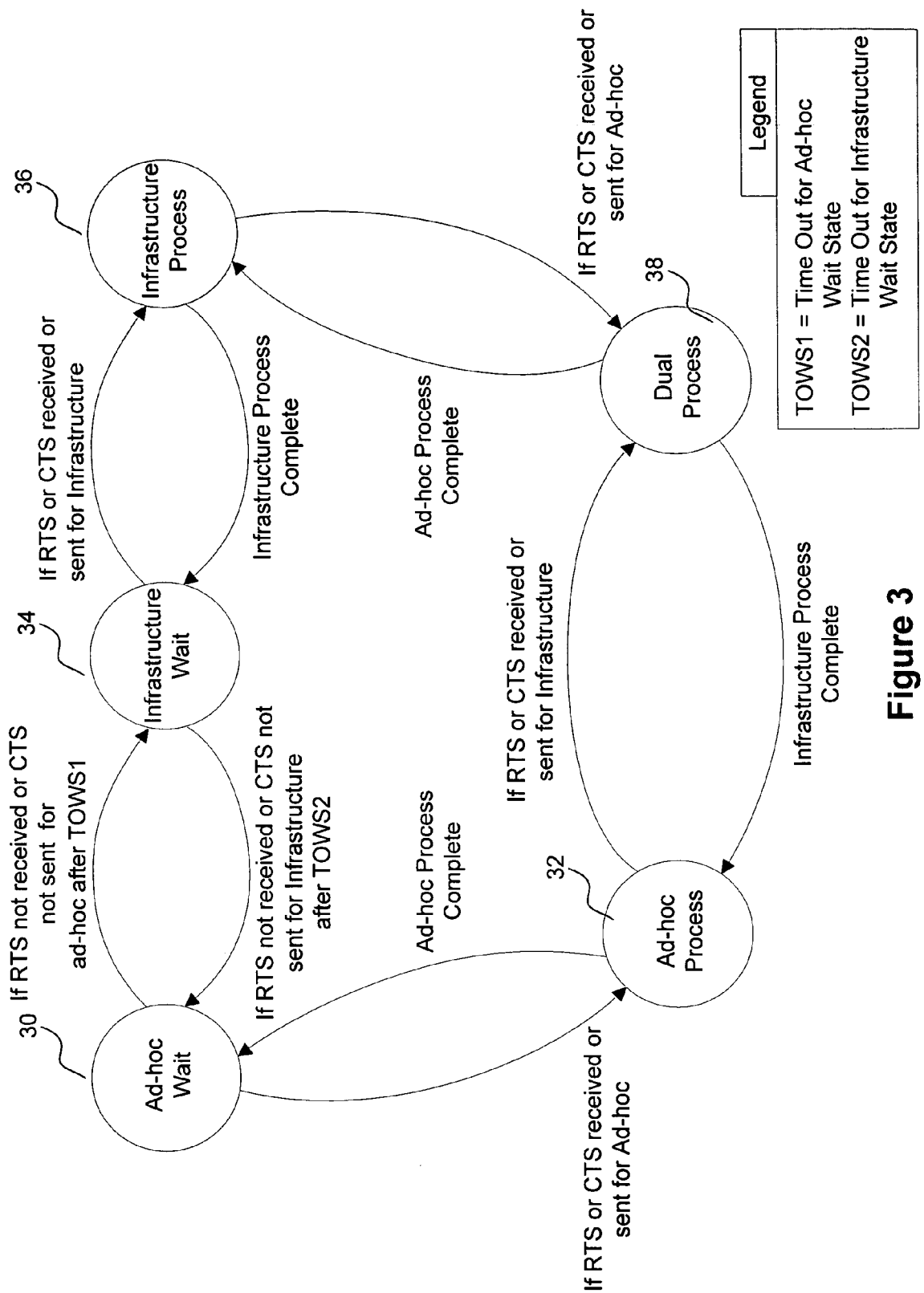
FIG. 3 illustrates the state diagram which embodies the present invention.

FIG. 3 illustrates the state machine embodying the present invention. The state machine may contain ad-hoc wait state 30, ad-hoc process state 32, infrastructure wait state 34, infrastructure process state 36, and dual process state 38. Ad-hoc process state 32 executes ad-hoc processes while infrastructure process state 36 executes infrastructure processes. Dual process state 38 concurrently executes both ad-hoc and infrastructure processes.

If the state machine is at ad-hoc process state 32 and an infrastructure RTS or CTS is received or sent, ad-hoc process state 32 transitions to dual process state 38 for concurrent execution of both processes. After dual process 38 executes the infrastructure process, the state machine transitions back to ad-hoc process state 32. If the state machine is at infrastructure process state 36 and an ad-hoc RTS or CTS is received or sent, infrastructure process state 36 transitions to dual process state 38 for concurrent execution of both processes. After dual process state 38 executes the ad-hoc process, the state machine transitions back to infrastructure process state 36.

Ad-hoc wait state 30 waits for ad-hoc RTS or CTS signals for a predetermined timeout labeled TOWS1 (Time Out for Ad-hoc Wait State.) If an ad-hoc signal is not detected within TOWS1, ad-hoc wait state 30 transitions to infrastructure wait state 34 to listen for infrastructure signals. If an ad-hoc signal is detected within TOWS1, the ad-hoc wait state 30 transitions to the ad-hoc process state 32, which executes the ad-hoc process. After ad-hoc process state 32 executes the ad-hoc process, ad-hoc process state 32 transitions back to ad-hoc wait state 30 to wait for additional ad-hoc signals.

Conversely, infrastructure wait state 34 waits for infrastructure RTS or CTS signals for a predetermined timeout labeled TOWS2 (Time Out for Infrastructure Wait State.) If an infrastructure signal is not detected within TOWS2, infrastructure wait state 34 transitions to ad-hoc wait state 30 to listen for ad-hoc signals. If an infrastructure signal is detected within TOWS2, the infrastructure wait state 34 transitions to infrastructure process state 36, which executes the infrastructure process. After infrastructure process state 36 executes the infrastructure process, infrastructure process state 36 transitions back to infrastructure wait state 34 to wait for additional infrastructure signals.

As stated earlier, TOWS1 and TOWS2 are predetermined timeouts for ad-hoc and infrastructure signals respectively, however, such timeouts can be changed to fit the needs of the user. If the majority of the traffic in the wireless network is ad-hoc mode, a user can increase TOWS1 in comparison to TOWS2 to allow a longer timeout to listen to ad-hoc requests, thus improving the efficiency of the wireless state machine. Conversely, TOWS2 can be increased in comparison to TOWS1 for networks which primarily use infrastructure mode. Such change in TOWS1 and TOWS2 may be manually configured or may be changed dynamically by using a mechanism to count the number of ad-hoc verses infrastructure requests, and to adjust the values of TOWS1 and TOWS2 accordingly.

This switching between listening for ad-hoc and infrastructure signals, and the features of dual process state 38 allows the present invention to concurrently support both types of wireless networking modes. Although ad-hoc and infrastructure wireless networking modes are mentioned in the application, the present invention is not limited to these wireless networking modes.

Figure 5:
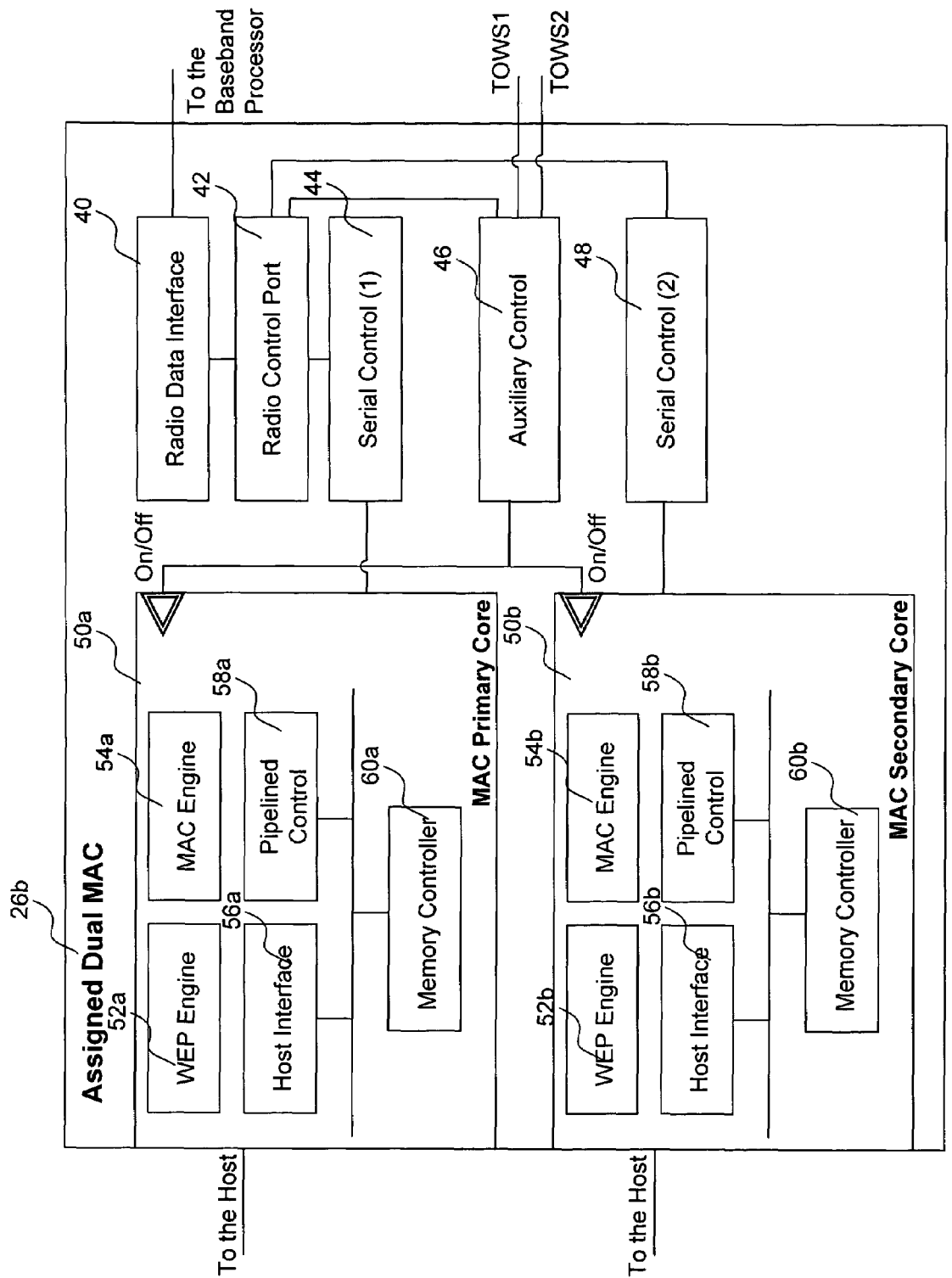
FIG. 5 illustrates the hardware components of the assigned dual MAC.

Dual process state 38 may require dual MAC 26b, 26c, 26d, or 26e, that can process both types of wireless networking modes. Current wireless cards which use MAC core 26a (FIG. 1) can only support one wireless network mode at a time. A dual MAC core is preferable to allow concurrent processing of both wireless networking modes. FIG. 5 further illustrates assigned dual MAC 26b.

Assigned Dual MAC

Figure 4:
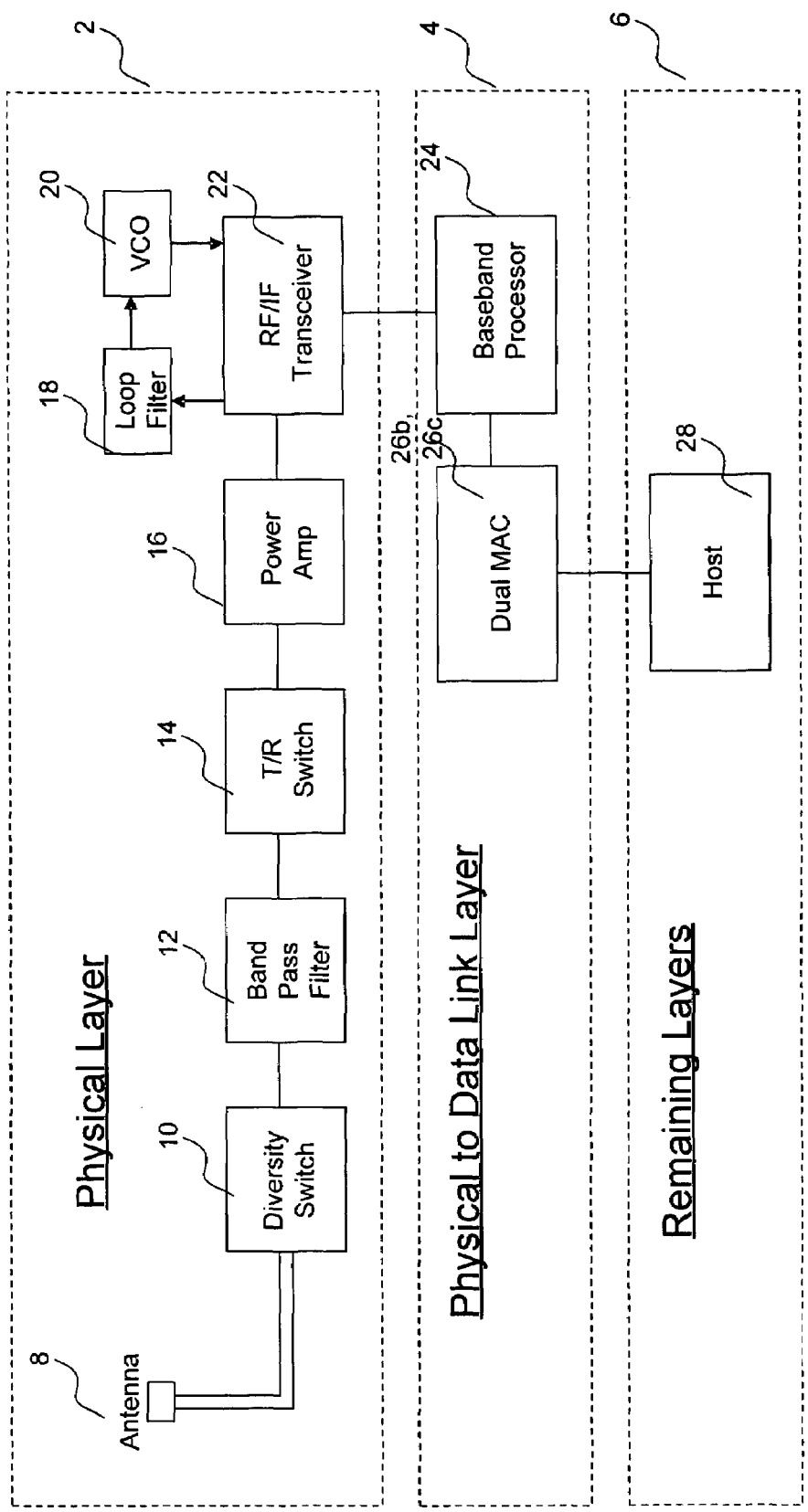
FIG. 4 illustrates the hardware components embodying the present invention, which includes the dual MAC.

In one embodiment of the present invention, assigned dual MAC 26b preferably contains MAC primary core 50a and MAC secondary core 50b (FIG. 4.) MAC primary core preferably contains wired equivalent privacy (WEP) engine 52a, MAC engine 54a, host interface 56a, pipelined control 58a, and memory controller 60a. MAC secondary core 50b preferably contains WEP engine 52b, MAC engine 54b, host interface 56b, pipelined control 58b, and memory controller 60b, which are the equivalent of the components of MAC primary core 50a. Assigned dual MAC 26b preferably contains radio data interface 40, radio control port 42, serial control (1) 44, auxiliary control 46, and serial control (2) 48.

Radio data interface 40 receives radio data from the baseband processor 24. Radio control port 42 receives data from radio data interface 40 and detects and processes both ad-hoc and infrastructure requests from the radio data. Serial control (1) 44 takes the data from radio control port 42, converts the data into serial data, and sends the serial data to MAC primary core 50a. Serial control (2) 48 takes data from radio control port 42, converts the data into serial data, and sends the serial data to MAC secondary core 50b.

Each MAC core is assigned to execute either ad-hoc processes or infrastructure processes. For example, MAC primary core 50a may be assigned to execute ad-hoc processes while MAC secondary core 50b may be assigned to execute infrastructure processes. Assigned dual MAC 26b incorporates the state diagram illustrated in FIG. 3 and as described above. In accordance with the state diagram of FIG. 3, auxiliary control 46 activates and deactivates MAC primary core 50a and MAC secondary core 50b based upon TOWS1 and TOWS2. During TOWS1, auxiliary control 46 activates MAC primary core 50a in anticipation of having to process the ad-hoc channel. If radio control port 42 detects an ad-hoc RTS or CTS during TOWS1, serial control (1) 44 will serialize the data, send it to MAC primary core 50a, and MAC primary core 50a will proceed to execute the ad-hoc process. During TOWS2, auxiliary control 46 activates MAC secondary core 50b in anticipation of having to process the infrastructure channel. If radio control port 42 detects an infrastructure RTS or CTS during TOWS2, serial control (2) 48 will serialize the data, send it to MAC secondary core 50b, and MAC secondary core 50b will proceed to execute the infrastructure process. It is also possible to have both MAC primary core 50a and MAC secondary core 50b concurrently process both ad-hoc and infrastructure requests. Such dual processing occurs when, for example, MAC primary core 50a is executing an ad-hoc process and radio control port 42 receives an infrastructure request. In this scenario, radio control port 42 routes ad-hoc requests to MAC primary core 50a and infrastructure requests to MAC secondary core 50b, serial control (1) 44 and serial control (2) 48 serialize the data for their respective MAC cores, and both MAC primary core 50a and MAC secondary core 50b concurrently execute both ad-hoc and infrastructure processes. FIG. 7 further illustrates a simplified timing diagram of the assigned dual MAC cores. The availability of two MAC cores and the assignment of each core to handle a specific wireless network mode allows the present invention to concurrently process both ad-hoc and infrastructure networking modes.

First-In First-Out (FIFO) Dual MAC

Figure 6:
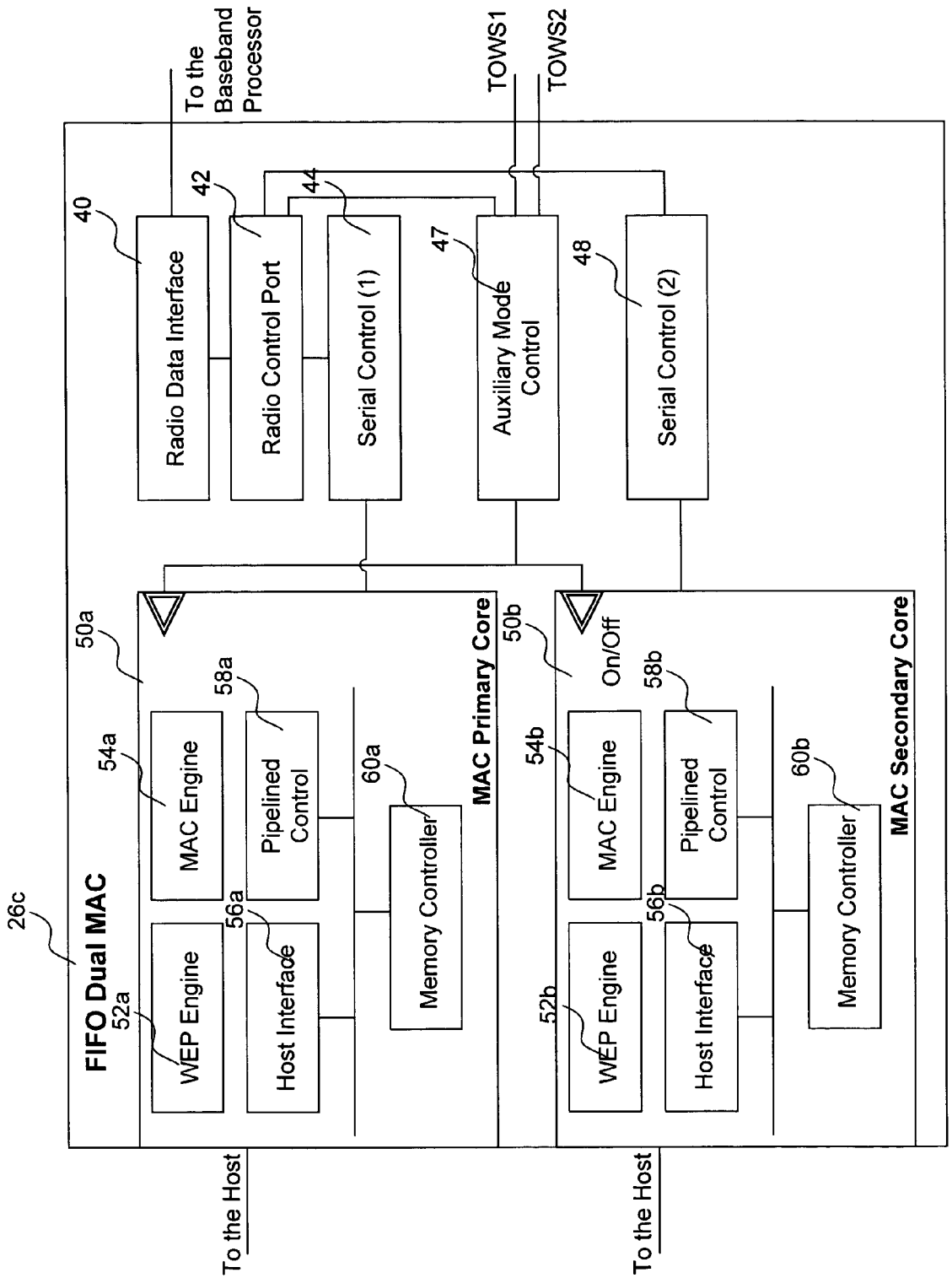
FIG. 6 illustrates the hardware components of the first-in first-out (FIFO) dual MAC.

FIG. 6 illustrates another embodiment of the dual MAC. Many portions of this embodiment are also found in the previous embodiment of assigned dual MAC 26b. In dual MAC 26c, auxiliary mode control 47 alternates the mode of MAC primary core 50a according to TOWS1 and TOWS2. During TOWS1, auxiliary mode control 47 switches MAC primary core 50a to listen for ad-hoc requests and during TOWS2, auxiliary mode control 47 switches MAC primary core 50a to listen for infrastructure requests. If an ad-hoc request is received or sent within TOWS1, MAC primary core 50a will proceed to execute the ad-hoc process. If an infrastructure request is received or sent within TOWS2, MAC primary core 50a will proceed to execute the infrastructure process. The first network traffic to arrive at radio data interface 40 will be the first process to be executed by MAC primary core 50a, regardless whether it is an ad-hoc or an infrastructure process.

If, for example, MAC primary core 50a is executing an ad-hoc process and an infrastructure request is detected by radio control port 42, auxiliary mode control 47 will activate MAC secondary core 50b, set MAC secondary core 50b to infrastructure mode, and MAC secondary core 50b will proceed to execute the infrastructure process. If, for example, MAC primary core 50a is executing an infrastructure process and an ad-hoc request is received at radio data interface 40, auxiliary mode control 47 will activate MAC secondary core 50b, set MAC secondary core 50b to ad-hoc mode, and MAC secondary core 50b will proceed to execute the ad-hoc process. FIG. 7 illustrates a simplified timing diagram of the FIFO dual MAC cores. Assigning MAC primary core 50a to handle the first network traffic type and assigning MAC secondary core 50b to handle the other network traffic type allows the present invention to concurrently process both ad-hoc and infrastructure networking modes.

Full-Time Dual MAC

This embodiment includes many of the features of the assigned dual MAC 26b and the FIFO dual MAC 26c discussed above. In this embodiment of the present invention, either an ad-hoc or an infrastructure process is executed using parallel processing over both MAC primary core 50a and MAC secondary core 50b if only one network mode is detected by radio control port 42. If, for example, MAC primary core 50a and MAC secondary core 50b are currently executing an ad-hoc process, and radio control port 42 detects an infrastructure process, both processes will be executed using either the FIFO dual MAC 26c or the assigned dual MAC 26b as previously discussed. The same will hold true if MAC primary core 50a and MAC secondary core 50b are currently executing an infrastructure process and radio control port 42 detects an ad-hoc process.

Over-Clocking MAC

Figure 8:
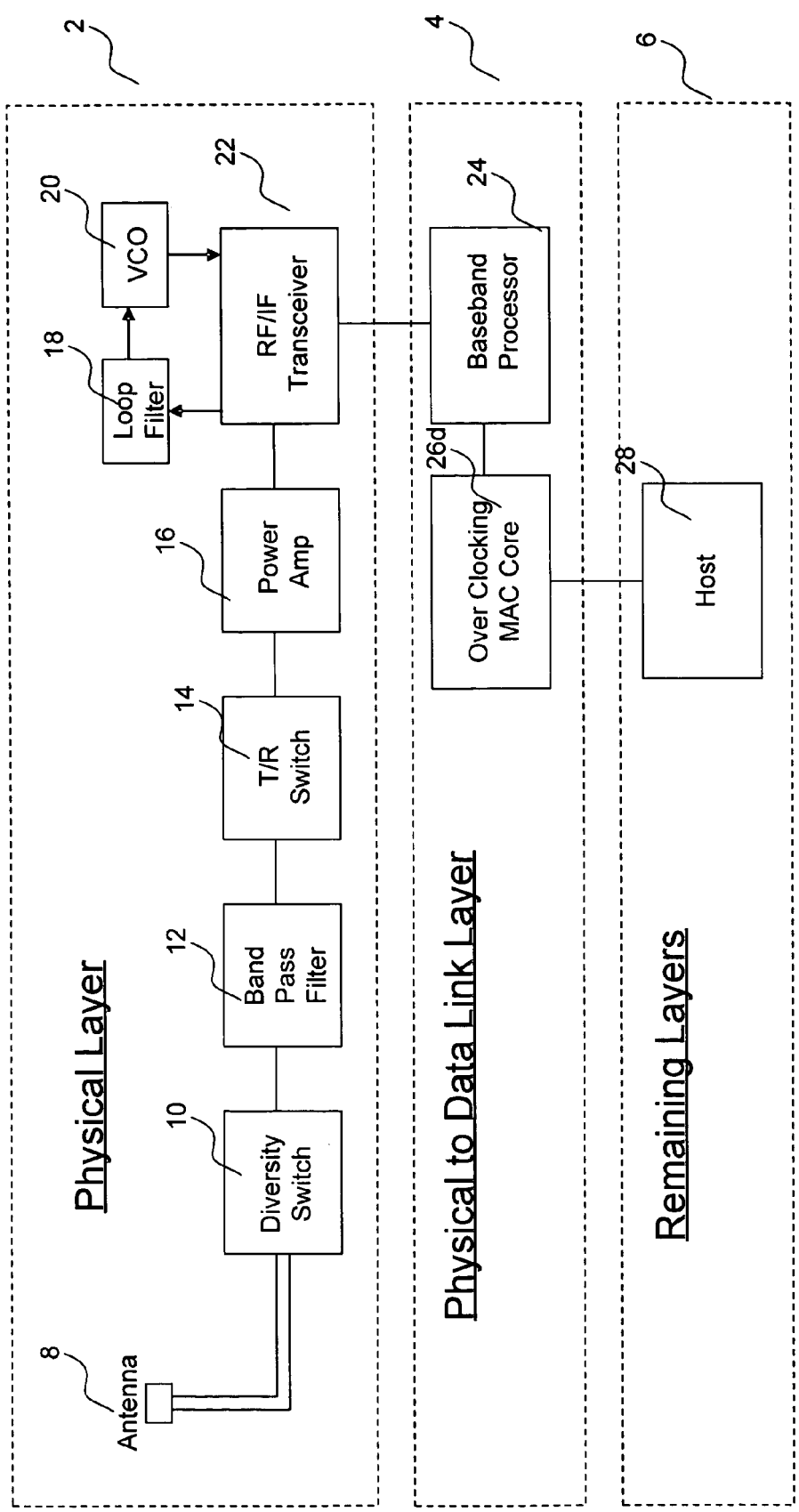
FIG. 8 illustrates hardware components embodying the present invention, which includes the over-clocking MAC core.
Figure 9:
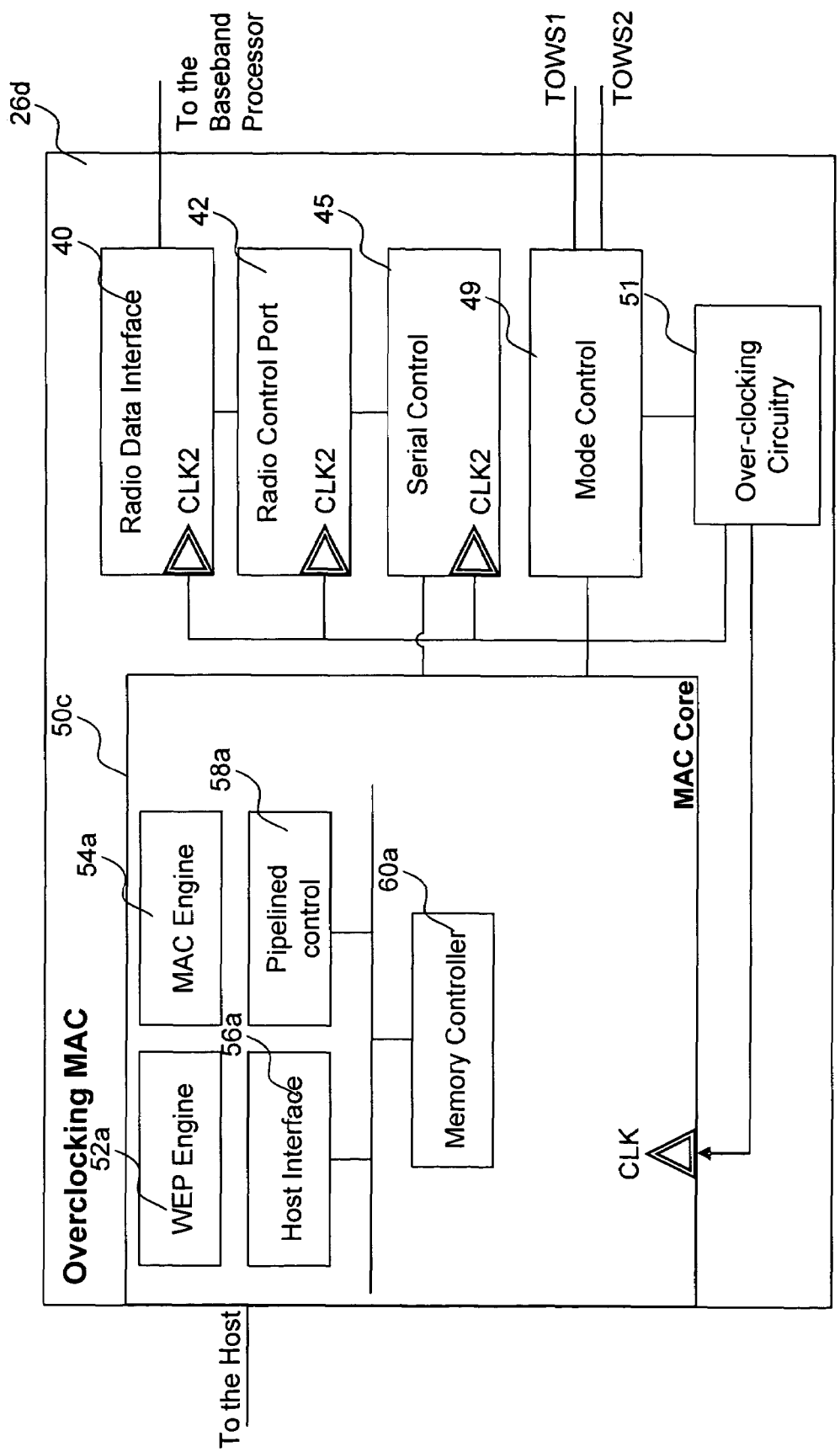
FIG. 9 illustrates hardware components of the over-clocking MAC core.

Yet another embodiment of the present invention is over-clocking MAC 26d, illustrated by FIGS. 8 and 9. Over-clocking MAC 26d contains many similar features of the dual MAC cores described above. Mode control 49 (FIG. 9) changes the mode of MAC core 50c to process either ad-hoc or infrastructure commands based on TOWS1 and TOWS2. During TOWS1, mode control 49 switches MAC core 50c to listen for ad-hoc processes and during TOWS2, mode control 49 switches MAC core 50c to listen for infrastructure processes. Over-clocking MAC 26d contains over-clocking circuitry 51 which sets radio data interface 40, radio control port 42, serial control 45 at a rate (CLK2) some multiple higher than the normal clocked rate in anticipation of having to concurrently process both ad-hoc and infrastructure requests. MAC core 50c may be set at either CLK or CLK2. If, during TOWS1, radio control port 42 detects an ad-hoc request and MAC core 50c is not currently executing an infrastructure process, MAC core 50c will proceed to execute the ad-hoc process at CLK. If, during TOWS2, radio control port 42 detects an infrastructure request and MAC core 50c is not currently executing an ad-hoc process, MAC core 50c will proceed to execute the infrastructure process at CLK. If, during TOWS1, radio control port 42 detects an ad-hoc request and MAC core 50c is currently executing an infrastructure process, over-clocking circuitry 51 will set MAC core 50c at CLK2 to concurrently execute both ad-hoc and infrastructure processes. If, during TOWS2, radio control port 42 detects an infrastructure request and MAC core 50c is currently executing an ad-hoc process, over-clocking circuitry 51 will set MAC core 50c at CLK2 to concurrently execute both ad-hoc and infrastructure processes.

Figure 10:
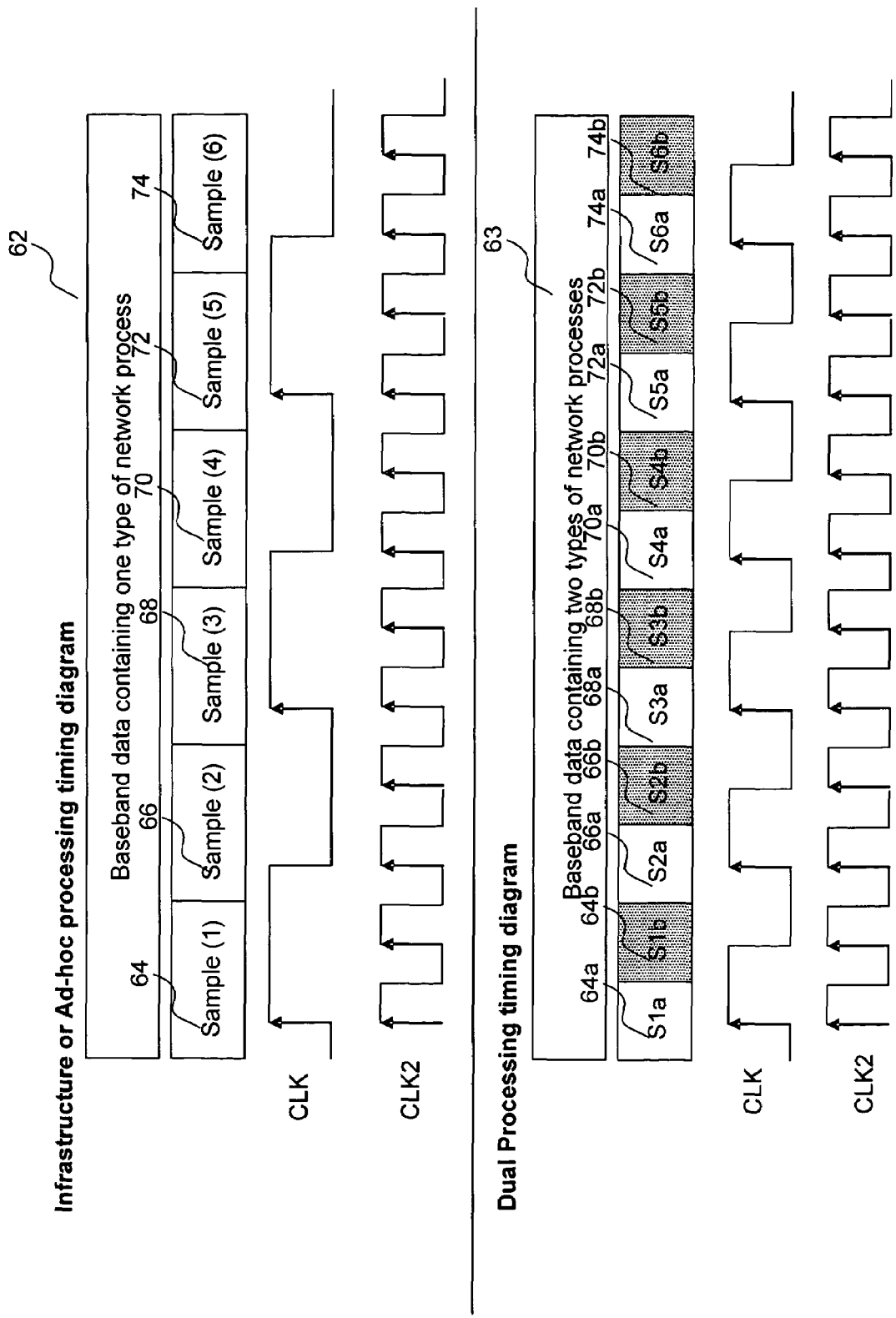
FIG. 10 represents timing diagrams for infrastructure, ad-hoc, and dual processing modes.

FIG. 10 illustrates the timing diagram for ad-hoc, infrastructure, and dual processing modes. Baseband data 62 contains one type of network process. In ad-hoc or infrastructure modes, samples 64-74 of baseband data 62 are each processed by MAC core 50c using clock CLK. In the dual processing timing diagram, baseband data 63 contains two types of network processes. Samples 64a-74a represent one of the two network processes, such as an ad-hoc process, while samples 64b-74b represent the other of the two network processes, such as an infrastructure process. In this timing diagram, MAC core 50c processes ad-hoc and infrastructure processes in an alternating fashion at CLK2. The reason for over-clocking MAC core 50c is that both networking modes need to be processed concurrently to maintain comparable performance as the single ad-hoc or infrastructure timing diagram.

Software MAC

Figure 1:
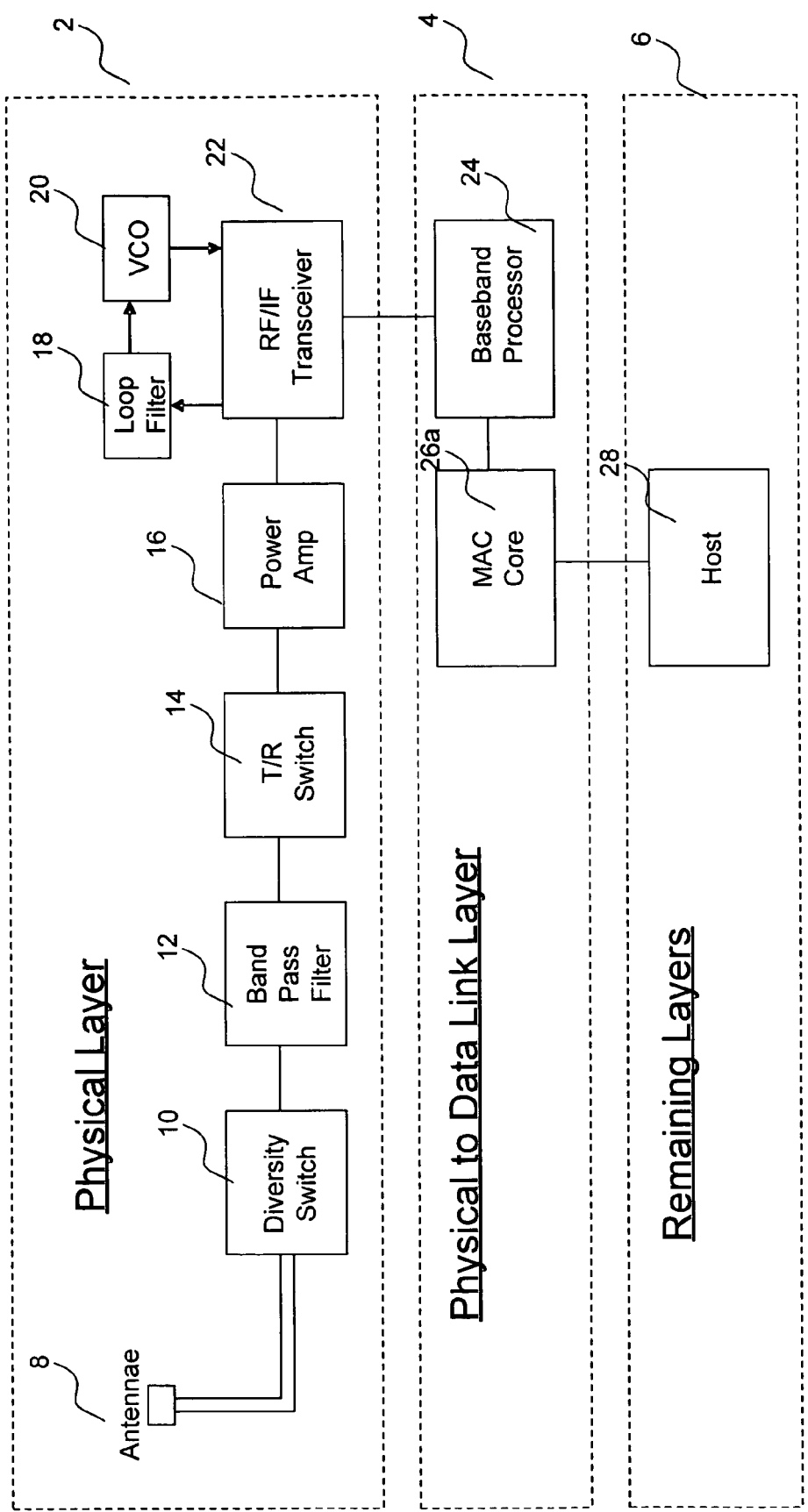
FIG. 1 illustrates the basic architecture of a wireless network card (prior art.)
Figure 11:
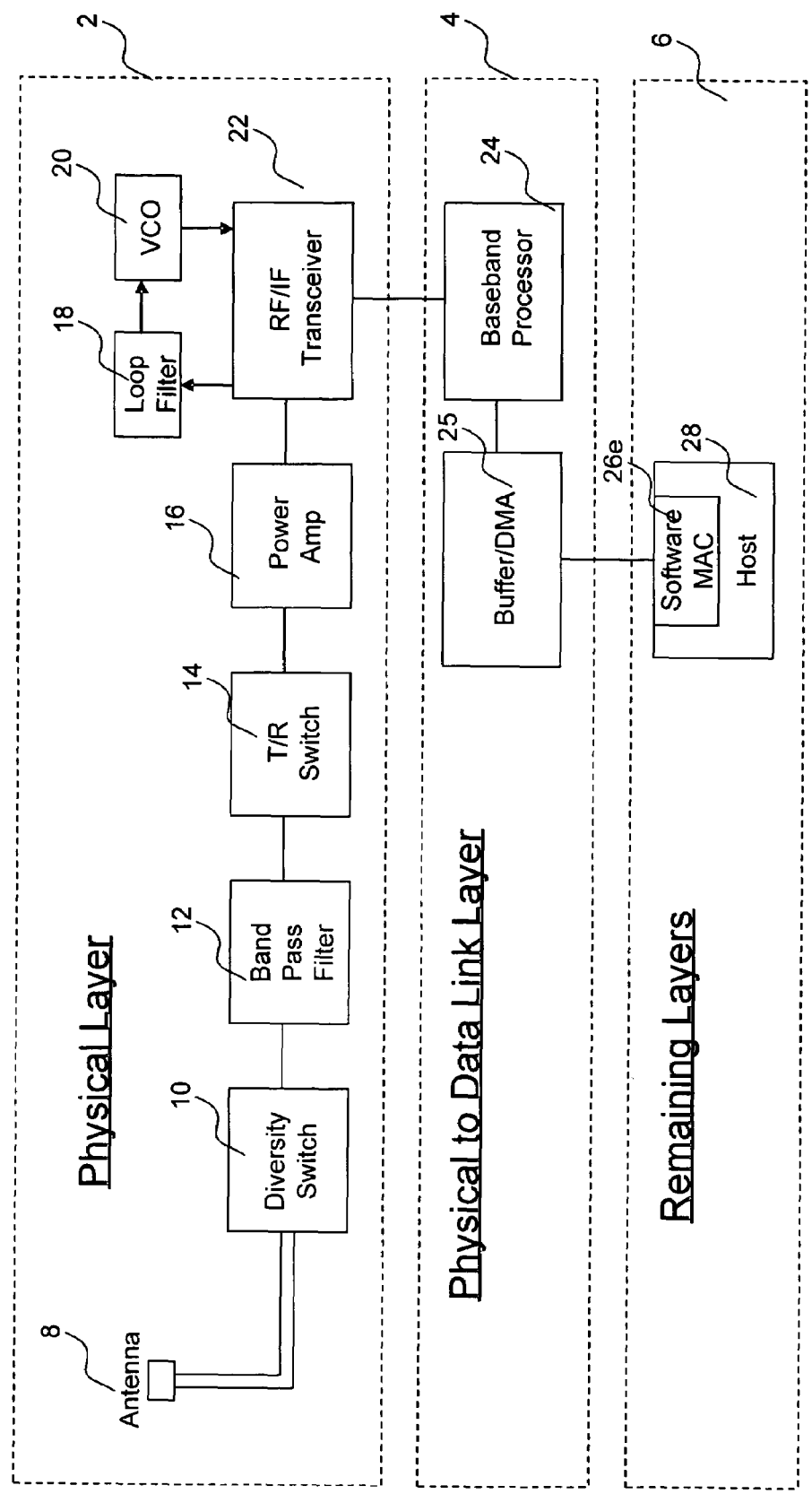
FIG. 11 illustrates hardware components embodying the present invention, which includes the software MAC core.

Current MACs are implemented in a hardware chipset as illustrated in FIG. 1. Currently, processing speeds of most PC's are fast enough to implement all the previously described embodiments using a software program. The state machine diagram as described in FIG. 3 may be implemented in software. FIG. 11 illustrates the architecture of a wireless card using software MAC 26e. Of course, physical layer 2 will still be needed to accomplish the task of wireless networking. In physical to data link layer 4, buffer/direct memory access (DMA) 25 is connected to baseband processor 24. Buffer/DMA 25 temporarily stores the data from baseband processor 24 before being processed by software MAC 26e, which resides in host 28. Software MAC 26e may execute an ad-hoc process, an infrastructure process, or both processes.

While the invention is described above with respect to what is currently its preferred embodiment, it is to be understood that the invention is not limited to that described above. To the contrary, the invention is intended to cover various modifications and equivalent arrangements within the spirit and scope of the appended claims.

What is claimed is:

1. A state machine comprising:
a first process state configured to receive a first signal and a second signal, to execute a first process upon receipt of the first signal, and to transition to the dual process state for processing upon receipt of the second signal;
a second process state configured to receive the first signal and the second signal, to execute a second process upon receipt of the second signal, and to transition to the dual process state for processing upon receipt of the first signal; and
a dual process state configured to concurrently execute the first process and the second process to transition to the first process state after completing execution of the second process, and to transition to the second process state after completing execution of the first process.

2. The state machine according to claim 1, further comprising:
a first wait state;
a first timeout period;
a second wait state; and
a second timeout period,
wherein the first wait state transitions to the second wait state if the first signal has either not been sent or has not been received within the first timeout period, and wherein the second wait state transitions to the first wait state if the second signal has either not been sent or has not been received within the second timeout period.

3. The state machine according to claim 2,
wherein the first wait state transitions to the first process state for processing if the first signal has either been sent or received within the first timeout period,
wherein the first process state transitions to the first wait state after executing the first process,
wherein the second wait state transitions to the second process state for processing if the second signal has either been sent or received within the second timeout period, and
wherein the second process state transitions to the second wait state after executing the second process.

4. The state machine according to claim 2, further comprising:
a counting mechanism configured to count the occurrences of the first signal and the second signal,
wherein the first timeout period is increased and the second timeout period is decreased if the count of the first signal is greater than the count of the second signal, and
wherein the second timeout period is increased and the first timeout period is decreased if the count of the second signal is greater than the count of the first signal.

5. The state machine according to claim 2,
wherein a user increases or decreases the first timeout period and the second timeout period.

6. The state machine according to claim 1,
wherein the first process is an ad-hoc process, the first process state is an ad-hoc process state, and the first signal is an ad-hoc request-to-send signal or an ad-hoc clear-to-send signal, and
wherein the second process is an infrastructure process, the second process state is an infrastructure process state, and the second signal is an infrastructure request-to-send signal or an infrastructure clear-to-send signal.

7. The state machine according to claim 2,
wherein the first wait state is an ad-hoc wait state and the second wait state is an infrastructure wait state,
wherein the first timeout period is a first predetermined period to wait for the ad-hoc clear-to-send or the ad-hoc request-to-send signal, and
wherein the second timeout period is a second predetermined period to wait for the infrastructure clear-to-send signal or the infrastructure request-to-send signal.

8. The state machine according to claim 1,
wherein the state machine operates within a wireless device.

9. An apparatus comprising:
a first processing core configured to execute a first process;
a second processing core configured to execute a second process;
a radio control port configured to detect and process a first signal and a second signal; and
an auxiliary control system, coupled to the radio control port, the first processing core, and the second processing core, which activates and deactivates the first processing core for executing the first process and the second processing core for executing the second process,
wherein the auxiliary control system is capable of activating the first processing core during execution of the second process and is capable of activating the second processing core during execution of the first process so that the first process and the second process are executed concurrently.

10. An apparatus according to claim 9, wherein the auxiliary control system comprises:
a first timeout period and a second timeout period,
wherein the first processing core is activated during the first timeout period and deactivated after the first timeout period has expired, and wherein the second processing core is activated during the second timeout period and deactivated after the second timeout period has expired.

11. An apparatus according to claim 9,
wherein the radio control port detects the first signal, requests the auxiliary control system to activate the first processing core, and the first processing core executes the first process, and
wherein the radio control port detects the second signal, requests the auxiliary control system to activate the second processing core, and the second processing core executes the second process.

12. An apparatus according to claim 9,
wherein the auxiliary control system deactivates the first processing core upon completion of execution of the first process and deactivates the second processing core upon completion of execution of the second process.

13. An apparatus according to claim 9, further comprising:
a radio data interface coupled to the radio control port;
a first serial control apparatus coupled to the radio control port and the first processing core; and
a second serial control apparatus coupled to the radio control port and the second processing core,
wherein the radio data interface processes a plurality of radio signals into a plurality of data,
wherein the first serial control apparatus processes the data into a plurality of serial data and sends the serial data to the first processing core, and
wherein the second serial control apparatus processes the data into a plurality of serial data and sends the serial data to the second processing core.

14. An apparatus according to claim 9,
wherein the radio control port detects the first signal, requests the auxiliary control system to activate both the first processing core and the second processing core, and executes the first process via the first processing core and the second processing core,
and wherein the radio control port detects the second signal, requests the auxiliary control system to activate both the first processing core and the second processing core, and executes the first process via the first processing core and the second processing core.

15. An apparatus according to claim 10,
wherein the first timeout period is a first predetermined period to wait for the ad-hoc clear-to-send or the ad-hoc request-to-send signal, and
wherein the second timeout period is a second predetermined period to wait for the infrastructure clear-to-send signal or the infrastructure request-to-send signal.

16. An apparatus according to claim 10, further comprising:
a counting mechanism configured to count the occurrences of the first signal and the second signal,
wherein the first timeout period is increased and the second timeout period is decreased if the count of the first signal is greater than the count of the second signal,
wherein the second timeout period is increased and the first timeout period is decreased if the count of the second signal is greater than the count of the first signal.

17. An apparatus according to claim 10,
wherein a user increases or decreases the first timeout period and the second timeout period.

18. An apparatus according to claim 9,
wherein the first process is an ad-hoc process,
the second process is an infrastructure process,
the first signal is an ad-hoc request-to-send or an ad-hoc clear-to-send signal, and
the second signal is an infrastructure request-to-send or an infrastructure clear-to-send signal.

19. An apparatus according to claim 9,
wherein the first process is an infrastructure process,
the second process is an ad-hoc process,
the first signal is an infrastructure request-to-send or an infrastructure clear-to-send signal, and
the second signal is an ad-hoc request-to-send or an ad-hoc clear-to-send signal.

20. An apparatus according to claim 9, wherein the first processing core is a media access control core and the second processing core is a media access control core.

21. An apparatus comprising:
a first processing core configured to execute either a first process or a second process;
a second processing core configured to execute either the first process or the second process;
a radio control port configured to detect and process a first signal and a second signal;
an auxiliary control system, coupled to the radio control port, the first processing core, and the second processing core, wherein the auxiliary control system activates and deactivates the first processing core for executing either the first process or the second process and activates and deactivates the second processing core for executing either the first process or the second process,
wherein the auxiliary control system is capable of activating the first processing core while the second processing core is executing either the first process or the second process and is capable of activating the second processing core while the second processing core is executing either the first process or the second process so that the first process and second process are executed concurrently.

22. An apparatus according to claim 21,
wherein the auxiliary control system toggles the first processing core to execute the first process or the second process, and toggles the second processing core to execute the first process or second process.

23. An apparatus according to claim 21, wherein the auxiliary control system comprises:
a first timeout period and a second timeout period;
wherein the first processing core is toggled to execute the first process during the first timeout period, and
wherein the first processing core is toggled to execute the second process during the second timeout period.

24. An apparatus according to claim 23,
the radio control port requests the auxiliary control system to toggle the first processing core to execute the first process.

25. An apparatus according to claim 23,
the radio control port requests the auxiliary control system to toggle the first processing core to execute the second process.

26. An apparatus according to claim 21, wherein the radio control port detects the second signal while the first processing core is executing the first process, and
requests the auxiliary control system to activate the second processing core and to toggle the second processing core to execute the second process.

27. An apparatus according to claim 21, wherein the auxiliary control system deactivates the second processing core upon the second processing core's completing execution of either the first process or the second process.

28. An apparatus according to claim 21, further comprising:
a first serial control apparatus coupled to the radio control port and the first processing core;
a second serial control apparatus coupled to the radio control port and the second processing core;
a radio data interface coupled to the radio control port,
wherein the radio data interface processes a plurality of radio signals into a plurality of data,
wherein the first serial control apparatus processes the data into a plurality of serial data, and sends the serial data to the first processing core, and
wherein the second serial control apparatus processes the data into a plurality of serial data, and sends the serial data to the second processing core.

29. An apparatus according to claim 21,
wherein the radio control port detects the first signal, requests the auxiliary control system to activate both the first processing core and the second processing core, and executes the first process via the first processing core and the second processing core,
and wherein the radio control port detects the second signal, requests the auxiliary control system to activate both the first processing core and the second processing core, and executes the first process via the first processing core and the second processing core.

30. An apparatus according to claim 23, further comprising:
a counting mechanism configured to count the occurrences of the first signal and the second signal,
wherein the first timeout period is increased and the second timeout period is decreased if the count of the first signal is greater than the count of the second signal,
wherein the second timeout period is increased and the first timeout period is decreased if the count of the second signal is greater than the count of the first signal.

31. An apparatus according to claim 23,
wherein a user increases or decreases the first timeout period and the second timeout period.

32. An apparatus according to claim 21,
wherein the first process is either an ad-hoc process or an infrastructure process, whichever process arrives first at the radio data interface,
wherein the second process is either an ad-hoc process or an infrastructure process, whichever process arrives second at the radio data interface,
wherein the first signal is either an ad-hoc request-to-send signal, an ad-hoc clear-to-send signal, an infrastructure request-to-send signal, or an infrastructure clear-to-send signal, whichever signal arrives first at the radio data interface, and
wherein the second signal is either an ad-hoc request-to-send signal, an ad-hoc clear-to-send signal, an infrastructure request-to-send signal, or an infrastructure clear-to-send signal, whichever signal arrives second at the radio data interface.

33. An apparatus according to claim 21, wherein the first processing core is a first media access control core and the second processing core is a second media access control core.

34. Computer-executable process steps stored on a computer-readable medium, the computer-executable process steps comprising:
detecting and processing a first wireless signal and a second wireless signal;

executing a first wireless process, wherein execution of the first wireless process begins upon receipt of the first wireless signal and ends after completion of the first wireless process;

executing a second wireless process, wherein execution of the second wireless process begins upon receipt of the second wireless signal and ends after completion of the second wireless process, wherein execution of the first wireless process and execution of the second wireless process are individually controlled so that the first wireless process and the second wireless process are executed separately or concurrently.

35. Computer-executable process steps according to claim 34, further comprising:

a first timeout period and a second timeout period, wherein execution of the first wireless process begins during the first timeout period and ends after the first timeout period has expired, and wherein execution of the second wireless process begins during the second timeout period and ends after the second timeout period has expired.

36. A computer-readable medium which stores computer-executable process steps, the computer-executable process steps comprising:

detecting and processing a first wireless signal and a second wireless signal;

executing a first wireless process, wherein execution of the first wireless process begins upon receipt of the first wireless signal and ends after completion of the first wireless process;

executing a second wireless process, wherein execution of the second wireless process begins upon receipt of the second wireless signal and ends after completion of the second wireless process, wherein execution of the first wireless process and execution of the second wireless process are individually controlled so that execution of the first wireless process and execution of the second wireless process are executed separately or concurrently.

37. A computer-readable medium according to claim 36, which stores computer-executable process steps, the computer-executable process steps further comprising:

a first timeout period and a second timeout period, wherein execution of the first wireless process begins during the first timeout period and ends after the first timeout period has expired; and wherein execution of the second wireless process begins during the second timeout period and ends after the second timeout period has expired.

* * * * *